Oct. 24, 1972          E. BORYSKO          3,700,489

PROCESS FOR APPLYING A THIN COATING OF POLYTETRAFLUOROETHYLENE

Filed July 30, 1970          2 Sheets-Sheet 1

INVENTOR.
EMIL BORYSKO
BY Robert W. Kell
ATTORNEY

Oct. 24, 1972  E. BORYSKO  3,700,489
PROCESS FOR APPLYING A THIN COATING OF POLYTETRAFLUOROETHYLENE
Filed July 30, 1970  2 Sheets-Sheet 2

INVENTOR.
EMIL BORYSKO
BY
Robert W. Kell
ATTORNEY

United States Patent Office 3,700,489
Patented Oct. 24, 1972

3,700,489
PROCESS FOR APPLYING A THIN COATING OF POLYTETRAFLUOROETHYLENE
Emil Borysko, Somerville, N.J., assignor to
Ethicon, Inc., Somerville, N.J.
Filed July 30, 1970, Ser. No. 59,415
Int. Cl. B44d 1/02
U.S. Cl. 117—106 R                          9 Claims

ABSTRACT OF THE DISCLOSURE

Polytetrafluoroethylene is condensed on the surface of a textile filament by heating the polytetrafluoroethylene in a vacuum to form the vapor phase and passing the filament through the vapor so obtained while rotating the filament on its axis. Surgical needles may be similarly coated by condensing polytetrafluoroethylene from the vapor phase.

Figure 1:
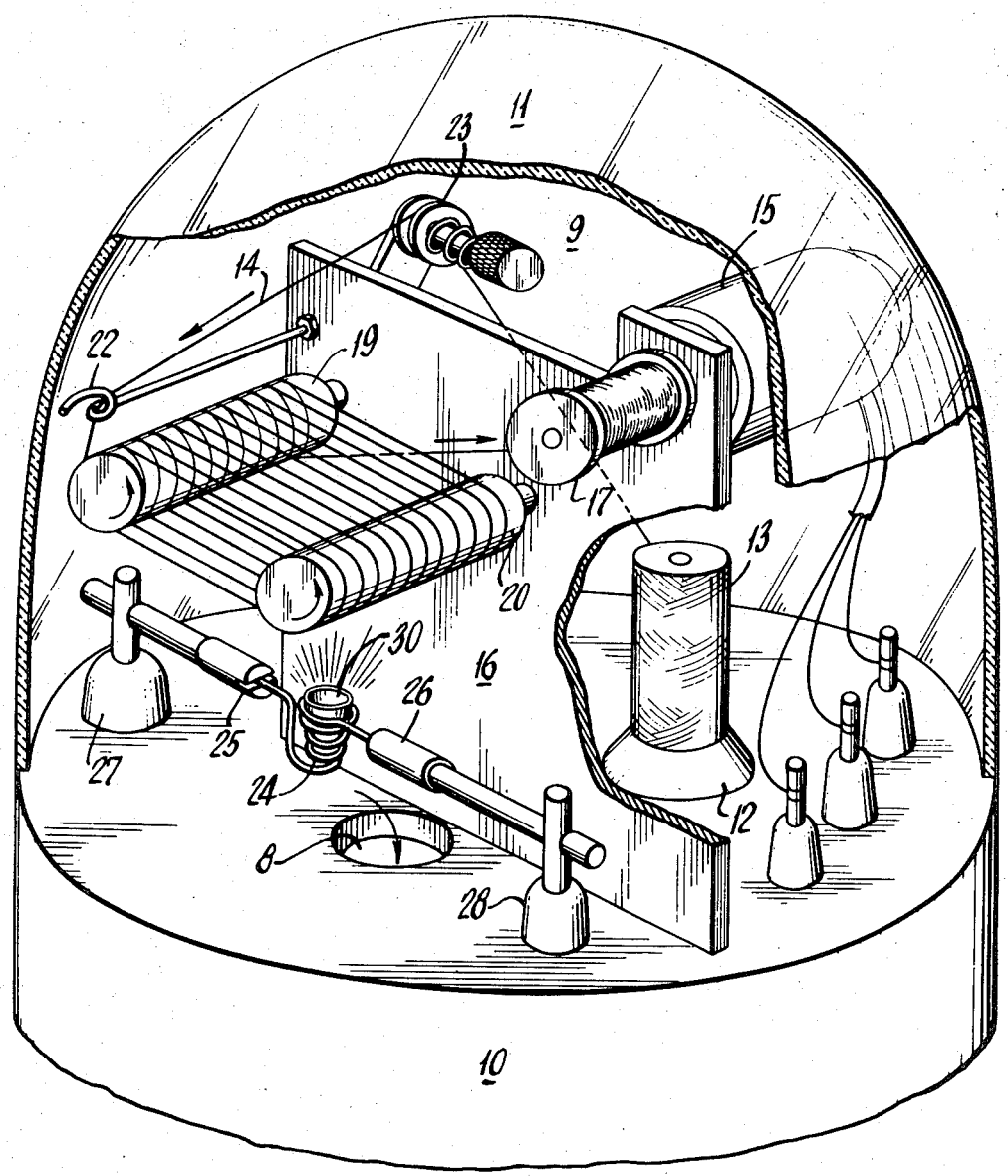

The present invention relates to the manufacture of polytetrafluoroethylene-coated surgical needles and sutures. The process to be described may also be used to manufacture metal- or carbon-coated filaments as described in my copending application, Ser. No. 50,574, filed June 29, 1970, now abandoned.

BACKGROUND OF THE INVENTION

The application of coatings or films of polytetrafluoroethylene (Teflon) to the surfaces of solid objects is known to reduce the coefficient of friction of the surface, reduce the adhesiveness of the surface, increase resistance to weathering and other chemical effects and reduce the electrical conductivity of the surface.

Currently available methods for applying coatings and films of Teflon involve either high temperature and/or pressures to fuse the Teflon to the surface or the application of a dispersion of Teflon particles in a suitable liquid containing a binder to the surface, the coating being formed by the evaporation of the liquid.

Teflon has been applied to braided polyethylene terephthalate (Dacron) sutures for the purpose of filling the interstices of the braided structure and achieving the characteristics of a solid monofilament. U.S. Pat. No. 3,322,125 describes in Example I impregnating a braided 4/0 polyethylene terephthalate suture with a suspension of Teflon particles having a particle size of about 0.2 micron. The suture is dried and stretched at 450° F., whereby the particles of Teflon are trapped within the body of the suture. It is a disadvantage of this process, however, that the Teflon particles do not adhere to the surface of the suture material and flake off when the suture is abraded. Moreover, this method is limited to coating objects that can withstand relatively high temperatures without suffering thermal decomposition.

A method of securing Teflon to the surface of the braided Dacron sutures with a binder resin which prevents flaking of the resinous particles is described in U.S. application Ser. No. 692,283, filed Dec. 21, 1967, now U.S. Pat. No. 3,527,650. In accordance with that method, a braided polyethylene terephthalate suture is passed through an aqueous mixed dispersion of an acrylic latex and Teflon particles. The braided Dacron after it leaves the coating bath is dried and heat cured. The coating formed is dependent upon the presence of the binder resin to hold the Teflon particles in place and cannot be considered as a true film of Teflon.

It is a further disadvantage of the methods described above that the Teflon coating applied is excessively thick for many potential applications.

It is an object of this invention to apply thin continuous films of Teflon to the surfaces of a variety of materials without subjecting them to excessive heat or pressure.

Another object of this invention is to control the deposition of the film so that thicknesses ranging from a fraction of a micron to many microns can be obtained at will.

Yet another object of this invention is to provide an apparatus and method for applying a thin, uniform Teflon coating to all types of needles and threads in a one-step process without the limitations that result from the use of a binder resin.

The objects of this invention may be realized by placing a partially pyrolyzed, lubricating grade of Teflon powder such as Teflon Powder T1-126 produced by Liquid Nitrogen Processing Corporation, in an electrically-heated crucible contained in a vacuum chamber. The material to be coated is held several inches above the crucible in an apparatus designed to expose the surfaces to be coated to the Teflon vapor. The air in the chamber is pumped out to achieve a pressure of about one micron of mercury. The crucible is then heated until the Teflon melts and begins to boil, causing the pressure in the chamber to rise. The rate of boiling is controlled by manipulating the current in the heating element so that the pressure in the chamber does not exceed about 20 mircons of mercury. It is essential to vent the effluent gases from the vacuum pump outdoors since they may contain toxic components due to the partial decomposition of the Teflon that occurs on heating. The thickness of the Teflon film formed on the object is a function of the boiling rate, the time of exposure to the vapor and the shape of the object. For any particular object or material, conditions for obtaining the desired film thickness may be determined empirically.

The invention will appear more clearly from the following detailed description when taken in connection with the accompanying drawings, which show, by way of example, preferred embodiments of the inventive idea.

Figure 2:
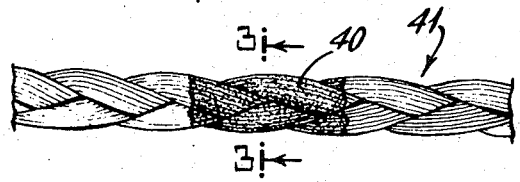
Figure 3:
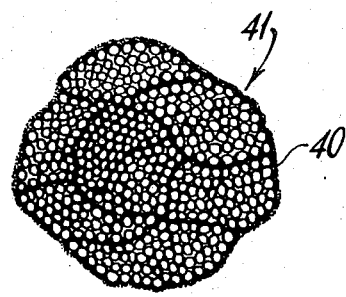
Figure 4:
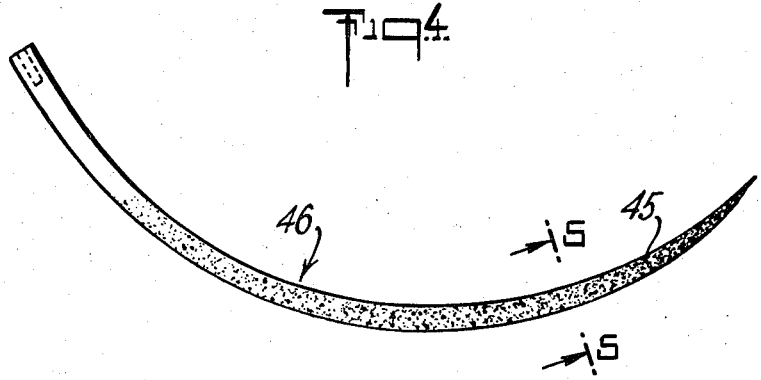
Figure 5:
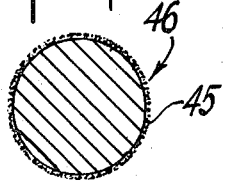

Referring now to the drawings:
FIG. 1 is a perspective view of the apparatus employed to carry out the process of the present invention;
FIG. 2 is a plan view of a braided Dacron suture that has been coated with Teflon in accordance with the present invention;
FIG. 3 is a greatly enlarged cross-sectional view of a braided Dacron suture on the line 3—3 of FIG. 2;
FIG. 4 is a plan view of a surgical needle, the surface of which is coated with Teflon;
FIG. 5 is a cross-sectional view on the line 5—5 of FIG. 4. Suitable apparatus for coating filaments with Teflon is illustrated in FIG. 1. The apparatus comprises a hermetically-sealed chamber 9 formed by the base 10 and a removable bell jar 11. The chamber may be evacuated by removal of air through an opening in the base. Within this chamber is mounted a thread transport mechanism, and a heating unit to volatilize the Teflon used in the coating process.

The thread transport mechanism comprises a vertical spindle 12 mounted on the base 10 in a position to receive a supply spool 13 of the thread to be coated. The thread 14 is transported through the chamber between the supply spool and a take-up spool 17 by a variable-speed electric motor 15 mounted on a vertical plate 16 that is supported by the base 10. To complete the description of the thread transport system, godets 19 and 20 are rotatably mounted on horizontal axles extending from the mounting plate parallel to the base 10. The godets are placed so that the thread passes back and forth directly in the path of the vapor generated by the heating unit thereby exposing all sides of the thread to the vapor. Preferably, the godets are placed several inches above and to either side of the vapor source. Spaced circumferential grooves on the surface of these godets are sized to receive the thread and maintain the lateral separation of the thread. A thread guide 22 extending from the vertical plate leads the thread into the outer groove of godet 19. The tension of the thread as it passes around the godets 19 and 20 and onto the take-up spool is controlled by a tensioning device 23.

The heating unit is positioned within the chamber 9 below the godets 19 and 20. This unit comprises a tungsten, tantalum, molybdenum, or columbium coil 24 connected to bus-bars 25 and 26 insulated from the base by porcelain insulators 27 and 28. A porcelain crucible 30 is supported by the coil 24.

In practice, the apparatus is threaded and the Teflon is placed in the crucible 30. The vacuum chamber is closed and air is pumped out of the chamber until a pressure of about one micron of mercury is reached. The coil 24 is heated by passing an electric current therethrough. The Teflon melts and evaporates from the crucible. The motor is started advancing the filament through the chamber from the supply spool to the take-up spool, and the Teflon vapor condenses on all sides of the thread as it passes between the two godets. The thread slowly twists as it passes between the godets as a result of having been taken off the end of the supply spool, ensuring complete coverage of the thread with Teflon.

The thickness of the coating deposited on any particular thread is a function of the rate of evaporation, the number of turns made by the thread between the godets and the linear velocity of the thread. These parameters can be determined empirically for any particular thread or end use of the coated thread. When either the thread supply or the supply of Teflon is exhausted, the current to the heating coil is turned off, air is admitted into the chamber and the spool of coated thread is removed. An empty take-up spool and a full supply spool are installed, tying in to the ends of the thread already on the rollers. The crucible is recharged with Teflon and the whole process is repeated.

The apparatus illustrated in FIG. 1 may be modified to coat other objects such as surgical needles with Teflon by substituting for the thread transport system a mechanical support for the object to be coated. A suitable support for surgical needles is a needle rack of the type illustrated in U.S. Pat. No. 3,268,428.

Teflon-coated sutures and needles manufactured in accordance with the present invention may be sterilized by any of the known and conventional methods, i.e., by heat, autoclaving, ethylene oxide sterilization, exposure to high energy electron beam irradiation, gamma irradiation, etc.

Example 1

The apparatus described above is used to apply a continuous coating of Teflon, one micron in thickness, to a braided Dacron filament. The crucible is charged with Teflon. A supply spool of .0124 inch green braided Dacron thread is placed on the spindle 13 and the thread is wound between the godets 19 and 20 (23 turns) to the take-up spool. The bell jar 11 is placed over the base closing the chamber and air is pumped out, until a vacuum of one micron of mercury is achieved. The crucible is heated electrically until the Teflon melts and begins to boil. The rate of boiling is controlled by adjusting the current in the coil 24 so that the vapor pressure in the chamber does not exceed twenty microns of mercury. The take-up motor is started and the thread becomes coated on all external surfaces as it passes through the stream of Teflon vapor. The thickness of the coating deposited on the thread is a function of the number of passes made between the godets and the linear velocity of the thread. The resultant product, illustrated in FIGS. 2 and 3, has the appearance of the original uncoated braided Dacron filament, but the Teflon coating reduces the surface friction of the thread resulting in a great improvement in knot tying characteristics. This is of importance when the thread is to be used as a suture. In FIG. 3, the thickness of the Teflon coating 40 that surrounds the braid 41 is greatly exaggerated to better illustrate the continuity and uniformity of the coating which would be difficult to visualize if drawn to scale.

Example 2

Collagen thread to be used as an absorbable surgical suture material is coated with Teflon in the same manner as described in Example 1 to improve knot tying characteristics.

Example 3

Monofilament nylon thread to be used as a nonabsorbable surgical suture material is coated with Teflon in the manner described in Example 2 to improve knot tying characteristics.

Example 4

Curved surgical needles are placed on a magnetic needle rack of the type illustrated in FIG. 4 of U.S. Pat. No. 3,268,428 or positioned by any suitable mechanical support within the vacuum chamber 9 of the apparatus illustrated in FIG. 1. The needles are held in a horizontal plane, in such a manner that their points are directed downwards towards the crucible containing the Teflon powder. The needle points are coated with Teflon in the manner described in Example 1. The magnetic rack will shield the drill hole in the end of the needle and prevent deposition of Teflon within the drill hole thus ensuring a firm grip when a suture is swaged on to the needle. The Teflon coating markedly reduces the force required for penetration of the needle as determined by a penetrometer. The coating, being extremely thin, does not interfere with the sharpness of the needles or with the highly polished appearance of the needles. The uniform Teflon coating that is obtained on the needle surface is illustrated in FIGS. 4 and 5. The thickness of the Teflon coating 45 that surrounds the needle 46 is greatly exaggerated to better illustrate the continuity and uniformity of the coating which would be difficult to visualize in a drawing to scale.

Example 5

A hypodermic needle is placed in a chuck supported in a vertical plane, in such a manner that the needle protrudes horizontally from the chuck and extends over the crucible containing the Teflon powder. The needle is coated with Teflon in the manner described in Example 1 while the chuck is rotated mechanically so that all sides of the needles are exposed to the Teflon vapors. The Teflon coating markedly reduces the force required for penetration of the hypodermic needle as determined by a penetrometer. The coating, being extremely thin, does not interfere with the sharpness or the highly polished appearance of the hypodermic needle.

What is claimed is:

1. A process for applying a coating of polytetrafluoroethylene to the surface of a surgical needle which comprises the steps of:
    placing the needle to be coated and a partially pyrolyzed lubricating grade of polytetrafluoroethylene in a vacuum chamber;
    heating said polytetrafluoroethylene to its melting point in a vacuum thereby vaporizing the polymer, and condensing the vapor so formed on the surface of said needle to form a thin, uniform coating of polytetrafluoroethylene.

2. A process for applying a coating of polytetrafluoroethylene to the surface of a hypodermic needle which comprises the steps of:
    placing the needle to be coated and a partially pyrolyzed lubricating grade of polytetrafluoroethylene in a vacuum chamber;

heating said polytetrafluoroethylene to its melting point in a vacuum thereby vaporizing the polymer, and condensing the vapor so formed on the surface of said needle to form a thin, uniform coating of polytetrafluoroethylene.

3. A continuous process for applying a coating of polytetrafluoroethylene to the surface of a textile filament which comprises the steps of:

heating a partially pyrolyzed lubricating grade of polytetrafluoroethylene to its melting point in a vacuum thereby vaporizing the polymer; and rotating said textile filament on its axis while moving it longitudinally through the vapor so formed whereby the polytetrafluoroethylene condenses on the surface of said filament to form a thin, uniform coating.

4. The process of claim 3 wherein said filament is a braided polyethylene terephthalate suture.

5. The process of claim 3 wherein said filament is a braided silk suture.

6. The process of claim 3 wherein said filament is a braided nylon suture.

7. The process of claim 3 wherein said filament is a polyethylene terephthalate monofilament.

8. The process of claim 3 wherein said filament is a nylon monofilament.

9. The process of claim 3 wherein said filament is a collagen monofilament.

References Cited

UNITED STATES PATENTS

| | | | |
|---|---|---|---|
| 2,814,296 | 11/1957 | Everett | 128—339 |
| 3,322,565 | 5/1967 | Smith | 117—106 R |
| 3,125,095 | 3/1964 | Kaufman et al. | 112—335.5 |
| 3,035,583 | 5/1962 | Hirsch et al. | 128—DIG 14 |
| 3,379,552 | 4/1968 | Kurtz | 117—7 |
| 3,480,547 | 11/1969 | Van Dyk | 28—75 R |

EDWARD G. WHITBY, Primary Examiner

U.S. Cl. X.R.

117—119, 126 R, 138.8 A, 138.8 F, 138.8 N, 161 R; 128—335.5, 339